United States Patent Office

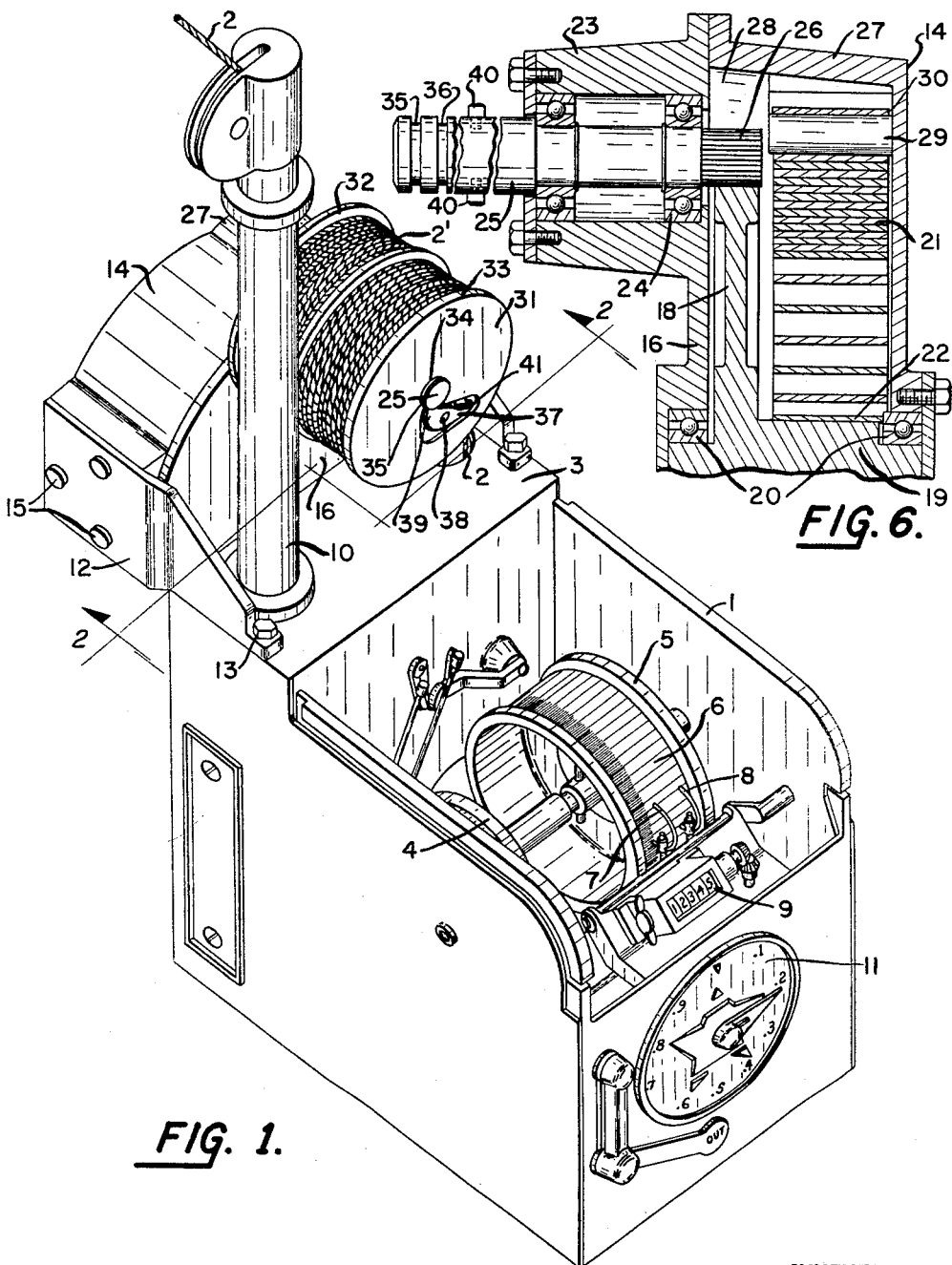

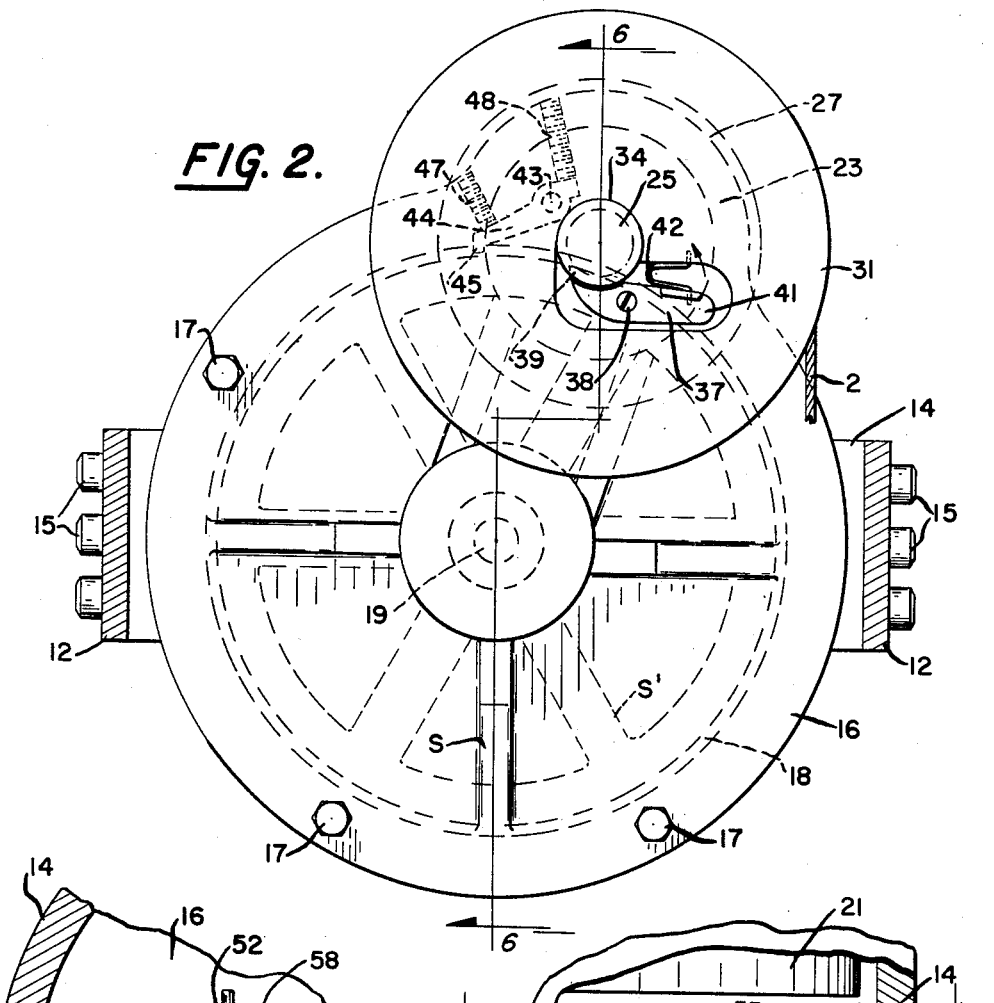
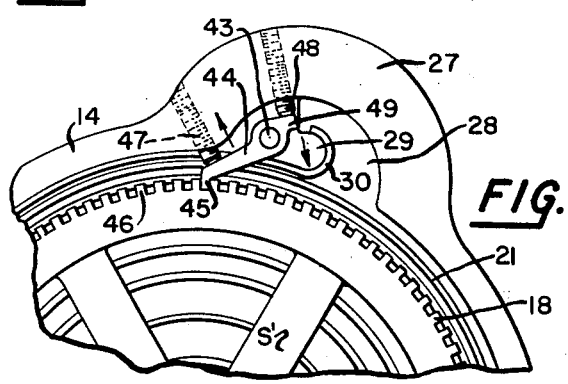

2,932,190
Patented Apr. 12, 1960

2,932,190

TENSION APPARATUS FOR A CABLE USED WITH RECORDING APPARATUS FOR EARTH BORE DRILLING

Oliver V. Phillips, Littleton, Colo., assignor to The Star Recorder Corporation of Denver, Denver, Colo., a corporation of Colorado Application October 18, 1954, Serial No. 462,834

9 Claims. (Cl. 73—151.5)

This invention relates to apparatus for tensioning a cable and particularly to a tension means for a cable associated with a recording device used in earth bore drilling whereby information as to the drilling operations and depth being drilled may be permanently recorded, all in relation to or correlated with time.

As is well known to those engaged in and familiar with earth bore drilling, many operations take place in addition to drilling, such as changing of drill bits and adding sections of drill pipe and it is most desirable to have a permanent or complete record of the rate of penetration when drilling, as well as a record of all the other operations taking place and these records should indicate the time consumed in conducting the operations and in drilling. The recording apparatus described and claimed in my co-pending application entitled "Recording Apparatus for Earth Bore Drilling" now Patent No. 2,860,509 permits such complete records to be obtained. However, in using such a recording device, means must be provided to connect the apparatus with the traveling block of the drilling equipment whereby movement of the drill stem will be accurately reflected in the apparatus.

Usually cable means is employed for connecting the traveling block with a drive pulley or measuring wheel or the like of the recording apparatus and in order to have a true reflection of the movement of the drilling stem, there must be no slack in the cable means. It is an important object of this invention to provide improved apparatus for tensioning the cable means whereby the recording apparatus may render a true reflection of movement of the drill stem and no slack in the cable means will be present to prevent accurate records of the type mentioned.

Another object of this invention is to provide improved apparatus associated wtih a recording device for tensioning the cable means employed in connecting the drive means of the device with the drill stem, said tension means being preferably adjusted following connection of the cable means with the traveling block of the drill stem and prior to coupling the cable means with the tension means.

Yet another object of this invention is to provide tension means for a cable of a recording apparatus of the type described whereby the tension may be set and locked following connection of the cable with the traveling block of the drill stem and prior to uniting the cable with the tension means whereby when the latter occurs the tension means may be unlocked and thus no slack in the cable will be insured.

Still another object of this invention is to provide an improved structure for tensioning a cable and means associated therewith whereby the cable may be maintained in its tensioned position when employed with a recording apparatus of the type described.

Finally, another object of this invention is to provide a cable tensioning apparatus which is simple to construct, is durable, which may be readily and easily associated with a recording apparatus of the type described and which may be simply connected to the cable after the latter is coupled to the traveling block of the drilling equipment.

Further objects and advantages will become apparent upon considering the following detailed description in conjunction with the drawings wherein:

Figure 1 is a perspective view of a recording apparatus with which the invention is employed and to which the invention is attached;

Figure 2 is a view taken along the lines 2—2 of Figure 1;

Figure 3 is a detailed view of the internal structure of part of the device shown in Figure 2;

Figure 4 is a detailed view showing another modification of the locking means for maintaining tension;

Figure 5 is a view along the lines 5—5 of Figure 4; and

Figure 6 is a sectional view taken along the lines 6—6 of Figure 2, but not including the retriever wheel assembly and being broken away as indicated.

The recording apparatus shown in Figure 1 and generally represented by numeral 1 may be used in the field in connection with a conventional well drilling rig and the apparatus 1 would preferably be positioned on the usual derrick platform. As is customary, the drilling stem which extends beneath the platform is connected through a kelly with the traveling block in a well known manner, whereby the drill stem to which the kelly is connected is lowered into the bore as hole is made by the drill bit at the bottom of the drill stem. The cable means 2 is preferably connected to the traveling block of the drilling rig after having been trained over any number of pulleys positioned on the derrick. It is necessary that cable means 2 be maintained in tension so there will be no slack therein and the movements of the traveling block will be accurately reflected in the cable means 2. There are prior art devices which eliminate slack by maintaining the cable tensioned, but such devices, to the best of my knowledge, are awkward and difficult to put into operation, while my invention permits ease of installation and operation.

Although the recording apparatus schematically illustrated in Figure 1 is described in detail in my said application, a few of the principal parts thereof will be described. Numeral 3 represents a partial top cover for the apparatus 1, while numeral 4 represents a clock for driving drum 5 upon which the chart or log sheet 6 is mounted. A penetration stylus or pen 7 is employed to indicate on the chart the rate of drilling penetration, while operations stylus or pen 8 will indicate thereon other operations conducted by the drilling crew. A counter for indicating footage drilled is shown at 9 and numeral 11 represents a dial for visually indicating the amount of drilling and one revolution of the pointer of the dial indicates that one foot of hole has been drilled. As explained in my said co-pending application, cable 2 is connected through the guide tube 10 to the traveling block of the drilling rig and beneath the cover 3 within apparatus 1 there is provided a pulley or measuring wheel over which cable 2 is trained and this measuring wheel functions as the driving element of the recording apparatus. Cable 2 must be maintained under tension so there will be no slack and the recording apparatus will truly reflect movements of the drilling stem and the present invention relates to structure for so tensioning the cable.

Extending rearwardly from apparatus 1 are brackets 12 which are integrally and rigidly mounted on the top of cover 3 by any suitable means 13 and these brackets provide the support for the tensioning structure. Numeral 14 represents a cast housing mounted and supported by brackets 12 by suitable means 15 and this housing is completely closed, except for the cast cover 16 which may be readily attached thereto by any suitable means 17 to provide a complete enclosure.

Within housing 14 there is positioned a main gear 18 having a central shaft portion 19 with reduced ends journaled in bearings 20 in the cover and housing as illustrated clearly in Figure 6. Also positioned within housing 14 is a clock-like coiled spring 21 having one end thereof 22 integral with shaft 19 of the main gear. The cover 16 is provided with an extending portion 23, as shown in Figure 6, within which is journaled for rotation on bearings 24 a shaft 25. Shaft 25 has a reduced end 26 in the form of a pinion gear, the teeth of which mesh with the teeth of gear 18, this also being illustrated clearly in Figure 6. The other end of shaft 25 and a substantial portion thereof extends forwardly from the cover 16 and thus it can be seen that by rotating shaft 25 manually with a crank or the like or otherwise, it acts as the driving element for gear 18. For example, rotation of shaft 25 in a clockwise direction similarly rotates gear 18 and this in turn winds the spring 21. It should be mentioned that the housing 14 has a raised projection, as indicated at 27 in Figure 3, and this projection provides an opening 28 within which there extends from the housing casting a boss-like member 29 and the other end 30 of the spring 21 is hooked onto this boss member 29 as indicated in Figure 3. The cover 16 and the gear 18 are provided, for rigidity purposes, with reinforcing ribs S and spokes S', respectively, as shown in Figure 2.

A retriever assembly is represented by numeral 31 and this assembly essentially consists of two joined together pulley wheels, as shown in Figure 1, with a spare cable 2′ being mounted on the innermost wheel 32 and the cable 2 which will be employed being trained over pulley 33. This reel 31 is capable of letting out or taking up approximately 180 feet of cable and is provided with an opening 34 through which the shaft 25 extends and the shaft and reel, respectively, are provided with pin means (not shown) and abutment means shown at 40 or other parts adapted for cooperating interlocking relationship whereby the reel may be keyed to rotate with shaft 25. It is to be noted that there are provided two circumferential grooves 35 and 36 at the outer end of shaft 25 and, as illustrated in Figures 1 and 6, a locking piece or dog 37 is pivotally mounted at 38 to the retriever wheel. One end 39 of this locking member is adapted to be received in either groove 35 or 36 and attached to the other end 41 and the retriever assembly by any suitable means is a spring 42, shown in Figure 2, which normally functions to bias the locking member or dog 37 in one or the other of the grooves 35 or 36.

Assuming that the reel 31 is positioned on the shaft 25 and it is moved inwardly thereon so that end 39 may engage groove 36, then the interengaging abutment 40 and pin means are so positioned that the reel is locked or keyed for rotation with shaft 25. In this position, the dog 37 merely functions as the retriever reel lock preventing the reel 31 from moving longitudinally on shaft 25 and insures interengaging of the pin and abutment means 40 for driving the wheel with the shaft or vice versa. By manually pivoting dog 37 against the action of spring 42, the retriever wheel 31 may be moved outwardly on the shaft 25 so that end 39 may engage groove 35 and when this occurs the pin and abutment means are not arranged for interlocking engagement and the retriever reel 31 may be rotated, if desired, without driving shaft 25, or independent thereof or, in other words, it is freely mounted on the shaft but insured from longitudinal movement off the shaft due to dog 37.

It can be seen that with end 39 positioned in groove 36, the wheel 31 may be rotated manually or otherwise in a clockwise direction to wind spring 21. Winding in this manner could continue until sufficient tension is developed and thereafter the cable 2, leaving guide tube 10, could be connected to the traveling block of the drill stem. To make this connection in this manner it would necessary for some individual to hold onto the reel 31 until the connection to the traveling block is made, as otherwise the tension spring 21 would cause counter-clockwise movement of the wheel 31. This is quite an awkward operation as there are many problems that are involved in attempting to connect the tensioned cable to the traveling block.

A very important feature of this invention permits locking of the retriever wheel 31 in the tensioned position whereby there is no necessity to hold the retriever wheel against counter-clockwise movement when connecting the cable 2 to the traveling block. In Figures 2 and 3 one embodiment of this means is illustrated and in Figures 4 and 5 a second embodiment is shown.

Referring to Figures 2 and 3, within opening 28 there is mounted for pivotal movement at 43 on boss 29 a dog 44 having a pawl-like end 45 for engaging the teeth 46 of the main gear 18. Threadedly connected within the cup-shaped extension or projection 27 of housing 14 are set screws 47 and 48 and these screws may be operated from the exterior of projection 27. Screw 48 is adapted to act on and engage end 49 of the dog 44, while screw 47 engages the dog 44 adjacent the pawl-like end 45 thereof. In operation, screw 47 is loosened and screw 48 is tightened to pivot the dog 44 out of engagement with teeth 46. Thereafter, the retriever wheel 31 may be positioned on shaft 25 for free wheeling with the end 39 of dog 37 in groove 35. At this time cable 2 may be unwound and trained over the measuring wheel, not shown, of apparatus 1 and up through the guide tube 10, whereupon the cable may be connected to the traveling block of the drilling equipment. The reel 31 may now be removed from shaft 25 by pivoting dog 37 and the reel placed on the ground or derrick platform nearby and, of course, the cable 2 would have considerable slack. Now, by crank means or otherwise, shaft 25 may be wound in a clockwise direction until spring 21 is sufficiently tensioned and at this time, by manipulating screws 47 and 48 until pawl-like end 45 engages a tooth 46, the spring may be locked in its wound position. Following this, reel 31 is placed on shaft 25 with the end 39 of dog 37 in groove 36 whereby the reel is keyed for rotation with the shaft. Thereafter the dog 44 is pivoted to unlock the tensioned spring and the latter will unwind an amount sufficient to tension cable 2 and insure that no slack exists, such permitting the recording apparatus 1 to accurately reflect the movement of the drill stem.

Instead of screw 47, there could be employed a compression spring contained within projection 27 and having one of its ends normally forcing end 45 into engagement with a tooth 46 and with such an arrangement it would be necessary to actuate only screw 48 to pivot dog 44.

Referring to the alternative embodiment of Figures 4 and 5, there are provided at suitably spaced intervals about the circumference of gear 18, grooves 51 and these grooves face in the direction of cover 16. Numeral 52 represents a bolt having its end 53 adapted for functioning as a tongue in grooves 51. The bolt 52 passes through an opening 54 in the cover 16 and is held therein with the end 53 in groove 51 by diametrically opposed fingers or projections 55 abutting the interior face of cover 16, as illustrated in both Figures 4 and 5. Positioned between head 56 and the exterior face of cover 16 is a coil spring 57 which tends to bias the bolt 52 outwardly with respect to the cover. When it is desired to move the end 53 from the groove 51, it is merely necessary to rotate the bolt 52 ninety degrees so that projections 55 will be aligned with slots 58 in cover 16 and the spring 57 biases the projections 55 into these slots. In operation, the locking device is positioned so that the end 53 is out of the recess 51 and the spring 21 may be wound in a manner previously described. At this time, the bolt 52 is pushed inwardly and the gear 18 may be further rotated until a groove 51 is aligned to receive end 53, whereupon the end is moved into the groove and the bolt rotated ninety degrees to lock the end 53 within groove 51. The retriever assembly wheel or reel 31 is now placed on shaft 25 and keyed to rotate therewith, whereupon the tongue 53 is removed from groove 51 and the cable 2 connected to the traveling block will be tensioned.

Actually, the employment of locking means of the type shown in Figure 3 or 4 is the most important feature of this invention as such permits ease and simplicity of operation in connecting the cable of the recording apparatus to the traveling block of the drilling equipment in a manner that will maintain the cable tensioned and eliminate slack therein so that accurate recordings may be made by apparatus 1.

It is to be understood that the tension means disclosed constitutes examples of preferred embodiments of the invention, but modifications are possible in the particular structures without departing from the fundamental principles of the invention. Although both embodiments of the tension means have been shown as having special use with a recording apparatus used in earth bore drilling, the principles thereof may be used in connection with other devices or structures where cable tensioning is desired. Thus, being aware of these possible modifications and uses, I desire it to be understood that the scope of the invention is not to be limited except in accordance with the terms of the appended claims and equivalents thereof.

What is claimed is:

1. As a subcombination in a drilling recording apparatus having a main drive member and a cable arranged to be connected for operating the drive member to accurately reflect in the latter movement of a drill stem, tension means for the cable comprising a rotatably mounted shaft, a reel for the cable mountable on the shaft, said shaft and reel having cooperating means for locating the reel on the shaft in one position for rotation therewith and in a second position for free-wheeling on the shaft, said reel being located in the one position on said shaft during connection of the cable to the drive member and drill stem, means upon rotating the shaft in one direction for adjusting the tension means for desired tension, and means for locking the tension means in the adjusted tensioned position whereby the reel may be positioned in the second position and for unlocking the tension means while the reel is in the second position whereby the cable will become sufficiently tensioned.

2. Apparatus as defined in claim 1 wherein the cooperating means includes two spaced grooves on the shaft and pivotally operated means carried by the reel and engageable in one or the other of said grooves.

3. Apparatus as defined in claim 1 wherein the tension means further includes a gear operable by said shaft and a coiled clock-like spring connected to the gear to be wound thereby and the locking means includes a pawl engageable with a tooth of the gear.

4. Apparatus as defined in claim 3 wherein said pawl is pivotally mounted and screw means is provided for pivoting and maintaining the pawl in and out of engagement with a tooth of the gear.

5. Apparatus as defined in claim 1 wherein the tension means further includes a gear operable by said shaft, a coiled clock-like spring connected to the gear to be wound thereby and the locking means includes a groove in the gear, a member receivable in the groove but normally biased therefrom, and means to maintain the last named member in the groove.

6. Cable tensioning apparatus comprising a frame having journaled for rotation thereon a main gear and a shaft, means connecting the shaft in driving relation with the gear, a clock-like coiled spring connected at one end with the main gear and at its other end with the frame, a reel for a cable mountable on the shaft, said shaft and reel having cooperating means for locating the reel on the shaft in one position for rotation therewith and in a second positon for free-wheeling on the shaft, said reel being located in the one position on said shaft during connection of the cable to a movable member, means upon rotating the shaft in one direction for adjusting the tension of said spring and in turn said shaft for desired tension, and means for locking the spring in the adjusted tensioned position whereby the reel may be positioned in the second position and for unlocking the last named means while the reel is in the second position whereby the cable will become sufficiently tensioned.

7. Apparatus as defined in claim 6 wherein the locking means includes a groove in the main gear and a bolt on the frame having its end receivable in the groove, means to bias the bolt to maintain the end out of the groove, and means on the bolt cooperating with the frame for maintaining the end in said groove.

8. Apparatus as defined in claim 6 wherein the locking means includes a pawl engageable with a tooth of the main gear, said pawl being pivotally mounted on the frame, means to pivot and maintain the pawl out of engagement with a tooth, and means to maintain the pawl in engagement with a tooth.

9. Apparatus as defined in claim 6 wherein the cooperating means includes two spaced grooves on the shaft and pivotally operated means carried by the reel and engageable in one or the other of said grooves.

References Cited in the file of this patent

UNITED STATES PATENTS

| | | |
|---|---|---|
| 797,076 | Schultz | Aug. 15, 1905 |
| 1,232,299 | Hance | July 3, 1917 |
| 1,965,507 | Myers | July 3, 1934 |
| 2,026,665 | Beasley | Jan. 7, 1936 |
| 2,130,670 | Maynes | Sept. 20, 1938 |
| 2,249,114 | Coffman | July 15, 1941 |
| 2,287,819 | Nichols | June 30, 1942 |
| 2,623,387 | Pitcher | Dec. 30, 1952 |